United States Patent
Bouwman et al.

[11] Patent Number: 6,144,167
[45] Date of Patent: Nov. 7, 2000

[54] CIRCUIT ARRANGEMENT

[75] Inventors: Lambertus J. M. Bouwman, Eindhoven; Arjan Van Den Berg, Nijmegen, both of Netherlands

[73] Assignee: U.S. Philips Corporation, New York, N.Y.

[21] Appl. No.: 09/390,844

[22] Filed: Sep. 7, 1999

[30] Foreign Application Priority Data

Sep. 7, 1998 [EP] European Pat. Off. ............... 98202986

[51] Int. Cl.$^7$ .................................................. H05B 37/02
[52] U.S. Cl. ..................... 315/209 R; 315/219; 315/362
[58] Field of Search ............................... 315/209 R, 219, 315/225, 291, 307, 362, DIG. 2, DIG. 5, DIG. 7; 323/355

[56] References Cited

U.S. PATENT DOCUMENTS

| | | | |
|---|---|---|---|
| 4,017,785 | 4/1977 | Perper | 315/209 R |
| 4,884,180 | 11/1989 | Hoffmann | 363/21 |
| 5,384,518 | 1/1995 | Kido et al. | 315/225 |
| 5,663,875 | 9/1997 | Cassese et al. | 363/95 |
| 5,729,095 | 3/1998 | Shimokawa et al. | 315/176 |
| 5,856,916 | 1/1999 | Bonnet | 363/20 |
| 5,982,109 | 11/1999 | Konopka et al. | 315/209 R |
| 6,005,302 | 12/1999 | Borho et al. | 315/DIG. 7 |

FOREIGN PATENT DOCUMENTS

| | | | |
|---|---|---|---|
| 2383479A1 | 10/1978 | France | G05F 1/46 |
| 9702722A1 | 1/1997 | WIPO | H05B 41/29 |

*Primary Examiner*—Don Wong
*Assistant Examiner*—Thuy Vinh Tran
*Attorney, Agent, or Firm*—Bernard Franzblau

[57] ABSTRACT

A DC/DC converter of the flyback/forward converter type includes a switch (S), a transformer (T), a first diode (D1), a first capacitor (C1), a second diode (D2) and a second capacitor (C2). The first and the second capacitor are arranged in series between the output terminals (K3, K4) of the DC/DC converter. The DC/DC converter has a high efficiency and is very suitable for operating a lamp with a DC current.

7 Claims, 2 Drawing Sheets

CIRCUIT ARRANGEMENT

BACKGROUND OF THE INVENTION

This invention relates to a circuit arrangement for supplying a lamp, provided with a DC/DC converter comprising a first input terminal and a second input terminal for connection to a power supply source supplying a DC voltage, a transformer having a primary winding and a secondary winding, a first branch interconnecting the input terminals and comprising a series arrangement of a switching element and the primary winding, a control circuit coupled to a control electrode of the switching element for generating a control signal so as to render the switching element high-frequency conducting and non-conducting, a second branch comprising a series arrangement of a first unidirectional element and a first capacitive element and connecting a first end of the secondary winding to a second end, and a first output terminal and a second output terminal for connecting a load circuit comprising the lamp.

The invention also relates to an illumination unit comprising such a circuit arrangement and a load circuit which is coupled to the output terminals of the circuit arrangement and comprises a lamp.

A circuit arrangement as described in the opening paragraph is known from WO 97/02722. The known circuit arrangement comprises a DC/DC converter of the flyback type and is very suitable for supplying, for example, high-pressure discharge lamps. The output voltage supplied by the DC/DC converter consists of the sum of the power supply voltage and the voltage across the first capacitive element. If the desired value of the output voltage is relatively high, for example, because the lamp to be supplied has a high operating voltage, this means that, at a given value of the amplitude of the power supply voltage, the voltage across the first capacitive element must also be relatively high. A first drawback thereof is that the first capacitive element must be dimensioned for such a high output voltage, so that the first capacitive element is relatively voluminous and expensive. A second drawback is that the amount of energy dissipated during charging and discharging of the parasitic capacitance between the ends of the secondary winding is relatively large.

SUMMARY OF THE INVENTION

It is an object of the invention to provide a circuit arrangement in which the drawbacks described above are obviated to a considerable extent.

To this end, a circuit arrangement as described in the opening paragraph, according to the invention is characterized in that the ends of the secondary winding are also connected by means of a third branch which comprises a series arrangement of a second unidirectional element and a second capacitive element, and in that a terminal between the first unidirectional element and the first capacitive element is connected to the first output terminal, and a terminal between the second unidirectional element and the second capacitive element is connected to the second output terminal.

During operation of a circuit arrangement according to the invention, a voltage which is equal to the sum of the voltages across the first capacitive element and the second capacitive element is present between the first output terminal and the second output terminal. At a given value of the output voltage, both the first and the second capacitive element only need to be dimensioned for a part of this voltage. Moreover, the ripple on the output voltage has a relatively low value due to the high-frequency charge of the first and the second capacitive element. This is a result of the fact that the first capacitive element is charged when the switching element is conducting, whereas the second capacitive element is charged when the switching element is non-conducting. Consequently, the transfer of energy is spread over a relatively large time interval in each high-frequency period of the control signal. Moreover, a relatively high voltage can be realized between the output terminals at a relatively low value of the maximum amplitude of the AC voltage which is present across the secondary winding during operation. Due to this relatively low value of the amplitude of the AC voltage across the secondary winding, the amount of energy which is dissipated in the transformer and the switching element by charging and discharging of the parasitic capacitance between the ends of the secondary winding is relatively low. It has been found that oscillations due to leakage inductance of the transformer are also largely suppressed in a circuit arrangement according to the invention, which also yields a substantial efficiency improvement of the circuit arrangement.

Good results have been found for embodiments of a circuit arrangement according to the invention, in which the first and the second unidirectional element comprise a diode.

Good results have also been found for embodiments of a circuit arrangement according to the invention in which the DC/DC converter is a flyback converter.

A circuit arrangement according to the invention is particularly suitable for use in combination with a load circuit comprising a lamp whose filling mainly consists of neon, inter alia, because such a lamp has a relatively high operating voltage and because a circuit arrangement according to the invention is very suitable for generating a relatively high output voltage. A lamp whose filling mainly consists of neon is herein understood to mean a discharge lamp having a filling comprising neon such that red light is generated in the plasma of the lamp during stationary lamp operation, whose color point in the C.I.E. chromaticity diagram is located within the range bounded by the lines y=0.300, y=0.350, y=−x+1 and y=−x+0.99. Such a lamp is very suitable for use in an illumination unit, for example, for use as a signal light such as a brake light in a motorcar. Such an illumination unit preferably has a housing with a reflecting surface and means for positioning the lamp in the housing. If the signal light is not a brake light but, for example, a blinker, a wall of the lamp is preferably provided with a luminescent coating.

BRIEF DESCRIPTION OF THE DRAWING

These and other aspects of the invention are apparent from and will be elucidated with reference to the embodiments described hereinafter.

In the drawings.

DESCRIPTION OF THE PREFERRED EMBODIMENTS

Figure 1:
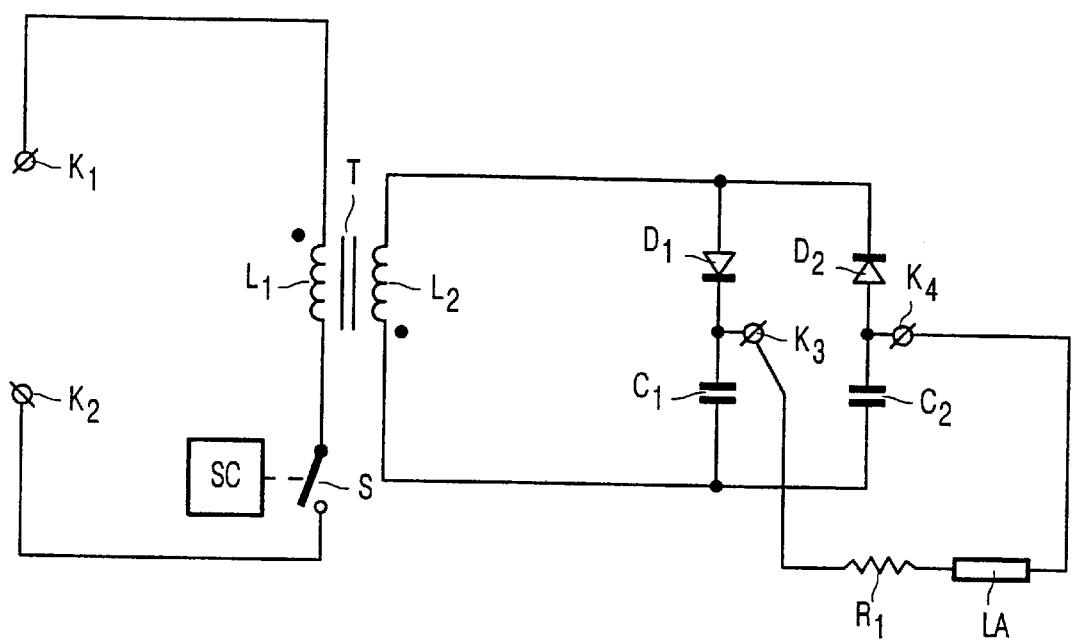
FIG. 1 shows diagrammatically an embodiment of a circuit arrangement according to the invention, with a load circuit comprising a lamp connected thereto.

In FIG. 1, K1 and K2 denote a first input terminal and a second input terminal, respectively, for connection to a power supply source supplying a DC voltage. Input terminals K1 and K2 are connected by means of a first branch which, in this embodiment, is constituted by a series arrangement of primary winding L1 of transformer T and switching element S. A control electrode of switching element S is coupled to an output of circuit section SC. Circuit section SC constitutes a control circuit for rendering the switching element S high-frequency conducting and non-conducting. L2 is a secondary winding of transformer T and is magnetically coupled to primary winding L1. Ends of secondary winding L2 are connected by means of a second branch which, in this embodiment, is constituted by diode D1 and capacitor C1, and by a third branch which is constituted by diode D2 and capacitor C2. In this embodiment, diodes D1 and D2 constitute a first and a second unidirectional element, respectively. In this embodiment, capacitors C1 and C2 constitute a first and a second capacitive element, respectively. K3 and K4 constitute a first and a second output terminal, respectively, for connecting a load circuit comprising a lamp. Output terminal K3 is connected to a common point of diode D1 and capacitor C1. Output terminal K4 is connected to a common point of diode D2 and capacitor C2. Output terminal K3 is connected to output terminal K4 by means of a series arrangement of an ohmic resistor R1 and a discharge lamp LA. In this embodiment, this series arrangement constitutes a load circuit. Ohmic resistor R1 is a stabilizing element for limiting the lamp current.

The embodiment shown in FIG. 1 operates as follows.

If input terminals K1 and K2 are connected to a power supply source supplying a DC voltage, the circuit section SC renders the switching element S high-frequency conducting and non-conducting. Consequently, a high-frequency AC voltage is present between the ends of secondary winding L2. When the switching element S is conducting, C2 is charged to a voltage which is approximately equal to the amplitude of the power supply voltage multiplied by the transformation ratio of the transformer T. When the switching element S is non-conducting, the voltage between the ends of the secondary winding has a reversed polarity and capacitor C1 is charged to a voltage whose amplitude can be adjusted by means of the duty cycle of the control signal generated by the control circuit SC. The sum of the voltages across capacitor C1 and capacitor C2 is present between the output terminals K3 and K4 and constitutes the voltage with which the load circuit is fed.

Figures 2A, 2B:
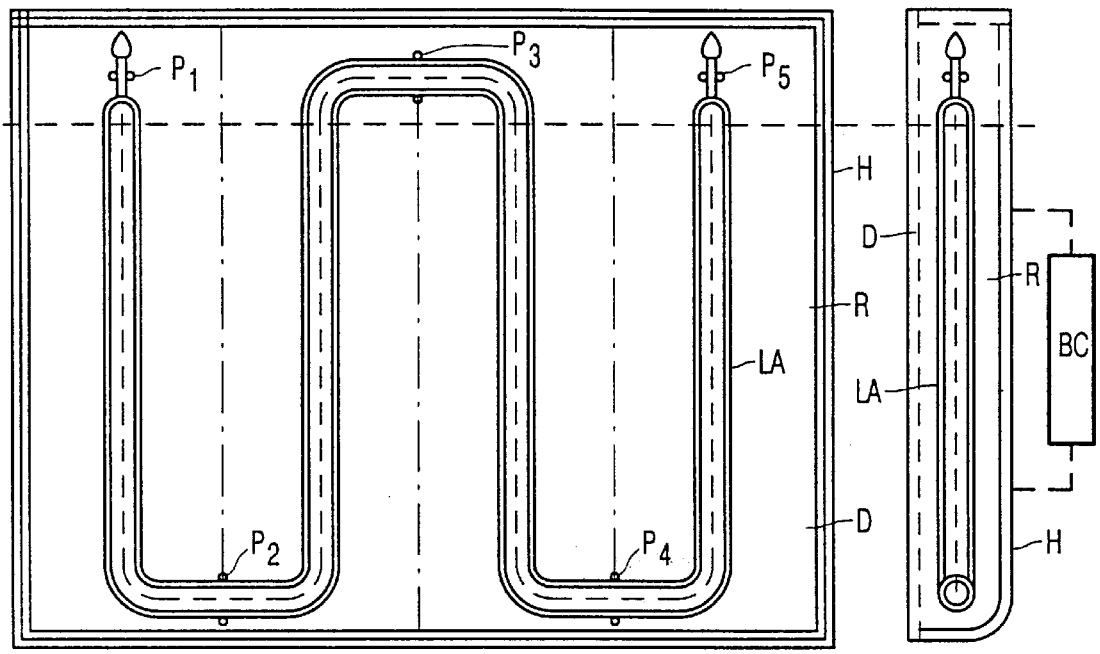
FIGS. 2 and 3 show an embodiment of an illumination unit according to the invention.
Figure 3:
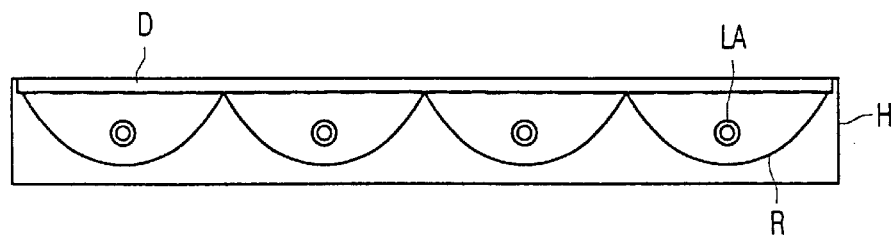

FIG. 2a in FIG. 2 is a front elevational view of an illumination unit according to the invention. FIG. 2b is a side elevational view of the same illumination unit. LA is a bent discharge lamp provided with a plasma consisting of neon. The wall of the discharge lamp has a luminescent coating. H constitutes a housing having a rectangular opening. The housing incorporates a mirror reflector R which constitutes the reflecting surface in this embodiment. The rectangular opening of the housing is closed by means of a light transmissive lid D. In this embodiment, terminals P1–P5 constitute means for positioning the discharge lamp in the housing. In FIG. 2b, the reference BC is an embodiment of a circuit arrangement according to the invention. The coupling between circuit arrangement BC and the lamp LA is shown diagrammatically by means of broken lines. FIG. 3 is a cross-section of the illumination unit in accordance with FIG. 2a and FIG. 2b, taken on the broken line shown in FIG. 2a and FIG. 2b and perpendicular to the plane in which the discharge lamp LA is bent.

What is claimed is:

1. A DC/DC converter circuit for supplying a lamp comprising:

a first input terminal and a second input terminal for connection to a power supply source supplying a DC voltage, a transformer having a primary winding and a secondary winding, a first branch interconnecting the input terminals and comprising a series arrangement of a switching element and the primary winding, a control circuit coupled to a control electrode of the switching element for generating a control signal so as to render the switching element high-frequency conducting and non-conducting, a second branch comprising a series arrangement of a first unidirectional element and a first capacitive element and connecting a first end of the secondary winding to a second end, and a first output terminal and a second output terminal for connecting a load circuit comprising the lamp, characterized in that the ends of the secondary winding are also connected by means of a third branch which comprises a series arrangement of a second unidirectional element and a second capacitive element, and in that a terminal between the first unidirectional element and the first capacitive element is connected to the first output terminal, and a terminal between the second unidirectional element and the second capacitive element is connected to the second output terminal.

2. A DC/DC converter circuit as claimed in claim 1, wherein the first and the second unidirectional element comprise a diode.

3. A DC/DC converter circuit as claimed in claim 1, wherein the DC/DC converter is a flyback converter.

4. An illumination unit comprising a DC/DC converter as claimed in claim 1, and a load circuit which is coupled to the output terminals of the DC/DC circuit arrangement and comprises a lamp.

5. An illumination unit as claimed in claim 4, comprising a housing with a reflecting surface and means for positioning the lamp in the housing.

6. An illumination unit as claimed in claim 4, wherein the lamp is a discharge lamp having a filling which mainly consists of neon.

7. An illumination unit as claimed in claim 4, wherein a wall of the lamp is provided with a luminescent coating.

* * * * *